(12) United States Patent
Ankney et al.

(10) Patent No.: US 10,549,864 B2
(45) Date of Patent: Feb. 4, 2020

(54) RFID ACTUATOR OVER-TORQUE INDICATOR

(71) Applicant: Hamilton Sundstrand Corporation, Charlotte, NC (US)

(72) Inventors: Darrell E. Ankney, Dixon, IL (US); Nicholas Wlaznik, Rockford, IL (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 64 days.

(21) Appl. No.: 15/972,384

(22) Filed: May 7, 2018

(65) Prior Publication Data

US 2019/0337635 A1 Nov. 7, 2019

(51) Int. Cl.
*B64D 45/00* (2006.01)
*G06K 7/10* (2006.01)
*G06K 19/077* (2006.01)

(52) U.S. Cl.
CPC ......... *B64D 45/00* (2013.01); *G06K 7/10009* (2013.01); *G06K 19/07773* (2013.01); *B64D 2045/0085* (2013.01)

(58) Field of Classification Search
None
See application file for complete search history.

(56) References Cited

U.S. PATENT DOCUMENTS

| 4,317,424 | A | 3/1982 | Steadman |
| 7,412,898 | B1* | 8/2008 | Smith ....................... G01L 5/24 73/761 |
| 8,584,957 | B2 | 11/2013 | Zhu et al. |
| 9,483,674 | B1* | 11/2016 | Fink ..................... G06K 7/10366 |
| 10,055,623 | B2* | 8/2018 | Chu ........................ F16B 1/0071 |
| 2006/0180650 | A1* | 8/2006 | Claessens .............. B65D 55/02 235/375 |
| 2010/0302012 | A1 | 12/2010 | Roesner |
| 2011/0167920 | A1* | 7/2011 | Rink .................... G01D 5/2451 73/760 |

(Continued)

FOREIGN PATENT DOCUMENTS

| DE | 102017002053 A1 | 9/2017 |
| EP | 3176655 A1 | 6/2017 |

OTHER PUBLICATIONS

European Search Report for Application No. 19173057.1, dated Oct. 9, 2019, 55 pages.

*Primary Examiner* — Christle I Marshall
(74) *Attorney, Agent, or Firm* — Cantor Colburn LLP

(57) ABSTRACT

An over torque detection system includes a mechanical torque sensor and a radio frequency identification (RFID) tag. The mechanical torque sensor includes first and second contact elements and a moveable element coupled to the first contact element. In a normal operational state the moveable element is in contact with the second contact element and creates an electrical pathway between the first and second contact elements and when in over torque operational state the movable element moves such that it does not contact the second contact element. The RFID tag is connected to the first contact element and the second contact element such that when the mechanical torque sensor is in the normal operation state the RFID tag does not transmit information, and when the mechanical torque sensor is in the over torque operation state the RFID tag does transmit information.

17 Claims, 6 Drawing Sheets

(56) References Cited

U.S. PATENT DOCUMENTS

| | | | |
|---|---|---|---|
| 2013/0068031 A1* | 3/2013 | Mekid | F16B 31/02 |
| | | | 73/761 |
| 2013/0186951 A1* | 7/2013 | Zhu | G06K 19/07779 |
| | | | 235/375 |
| 2015/0076283 A1 | 3/2015 | Schievelbusch et al. | |
| 2017/0016469 A1* | 1/2017 | Zhu | F16B 31/028 |
| 2017/0252882 A1* | 9/2017 | DeLand | B23Q 5/08 |
| 2017/0357833 A1* | 12/2017 | DeBates | G06K 19/07345 |
| 2019/0271681 A1* | 9/2019 | McKirdy | H04W 76/10 |

* cited by examiner

RFID ACTUATOR OVER-TORQUE INDICATOR

BACKGROUND

Exemplary embodiments pertain to the art of actuator torque monitoring and, in particular, utilizing radio-frequency identification (RFID) to indicate over-torque conditions and to identify actuators where such conditions occurred.

Modern aircraft often use a variety of high lift leading and trailing edge devices to improve high angle of attack performance during various phases of flight, for example, takeoff and landing. One such device is a trailing edge flap. Current trailing edge flaps generally have a stowed position in which the flap forms a portion of a trailing edge of a wing, and one or more deployed positions in which the flap extends outwards and down to increase the camber and/or plan form area of the wing. The stowed position is generally associated with low drag at low angles of attack and can be suitable for cruise and other low angle of attack operations. The extended position(s) is/are generally associated with improved air flow characteristics over the aircraft's wing at higher angles of attack.

In general, such devices can include a control unit that causes a main drive unit to produce rotation of a shaft or "torque tube". This rotation can then be converted to flap extension in known manners such as by use of a ball screw actuator. In such systems, each flap typically includes two actuators, one for each side of the flap.

When the actuators see an over torque condition or a jam in the movement of the flight surface, a mechanical over torque trip indicator (e.g., a spring) on the actuator releases indicating which actuator has seen the over torque or jam condition. The typical indicator is a mechanical indicator and cannot be known by the flight crew at the time of the trip. In some instances, determination of which actuator tripped cannot be known until the flight mechanic physically removes the access panels on the wing to visually reveal each actuator and mechanical trip indicator.

BRIEF DESCRIPTION

Disclosed is an over torque detection system that includes a mechanical torque sensor and a radio frequency identification (RFID) tag. The mechanical torque sensor includes: a first contact element; a moveable element coupled to the first contact element; and a second contact element. In a normal operational state the moveable element is in contact with the second contact element and creates an electrical pathway between the first contact element and second contact element and when in over torque operational state the movable element moves such that it does not contact the second contact element and breaks any electrical pathway between the first contact element and the second contact element. The RFID tag is connected to the first contact element and the second contact element such that when the mechanical torque sensor is in the normal operation state the RFID tag does not transmit information, and when the mechanical torque sensor is in the over torque operation state the RFID tag does transmit information.

In addition to one or more of the features described above, or as an alternative, in further embodiments of the system the antenna has first and second portions, the first portion being connected to the first contact element and the second portion being connected to the second contact element.

In addition to one or more of the features described above, or as an alternative, in further embodiments of the system when the mechanical torque sensor is in the normal operation state, the two portions are electrically connected to one another through the moveable element.

In addition to one or more of the features described above, or as an alternative, in further embodiments of the system the moveable element is a spring.

In addition to one or more of the features described above, or as an alternative, in further embodiments of the system the spring is biased to move away from the second contact element.

In addition to one or more of the features described above, or as an alternative, in further embodiments of the system when the mechanical torque sensor is in the over torque operation state, the two antenna portions are not electrically connected to one another through the moveable element.

In addition to one or more of the features described above, or as an alternative, in further embodiments of the system the moveable element is a spring.

In addition to one or more of the features described above, or as an alternative, in further embodiments of the system the spring is biased to move away from the second contact element.

In addition to one or more of the features described above, or as an alternative, in further embodiments of the system when the mechanical torque sensor is in the over torque state the RFID tag transmits information that identifies the actuator to which it is attached.

Also disclosed is a method of determining that an aircraft actuator installed on an aircraft has experienced an over torque condition. The actuator includes: a first contact element, a moveable element coupled to the first contact element; a second contact element. In a normal operational state the moveable element is in contact with second contact element and creates an electrical pathway between the first contact element and the second contact element, and when in over torque operational state the movable element moves such that it does not contact second contact element and breaks any electrical pathway between the first contact element and the second contact element. The method includes: coupling an RFID tag to the first contact element and the second contact element such that when the mechanical torque sensor is in the normal operation state the RFID tag does not transmit information and when the mechanical torque sensor is in the over torque operation state the RFID tag does transmit information; sending an interrogation signal from an RFID reader; and receiving, at the RFID reader, information back from the RFID tag.

In addition to one or more of the features described above, or as an alternative, in further embodiments of the method the RFID reader sends the interrogation signal during a flight and receives the information back during the flight.

In addition to one or more of the features described above, or as an alternative, in further embodiments of the method the RFID reader is located within the aircraft.

In addition to one or more of the features described above, or as an alternative, in further embodiments of the method the RFID reader sends the interrogation after the conclusion of a flight while the aircraft is on the ground.

In addition to one or more of the features described above, or as an alternative, in further embodiments of the method the RFID reader is located outside of the aircraft.

In addition to one or more of the features described above, or as an alternative, in further embodiments of the method the antenna has first and second portions and coupling further comprises: connecting the first portion to the first contact element and connecting the second portion to the second contact element.

In addition to one or more of the features described above, or as an alternative, in further embodiments of the method when the mechanical torque sensor is in the normal operation state, the two antenna portions are electrically connected to one another through the moveable element.

In addition to one or more of the features described above, or as an alternative, in further embodiments of the method the moveable element is a spring.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
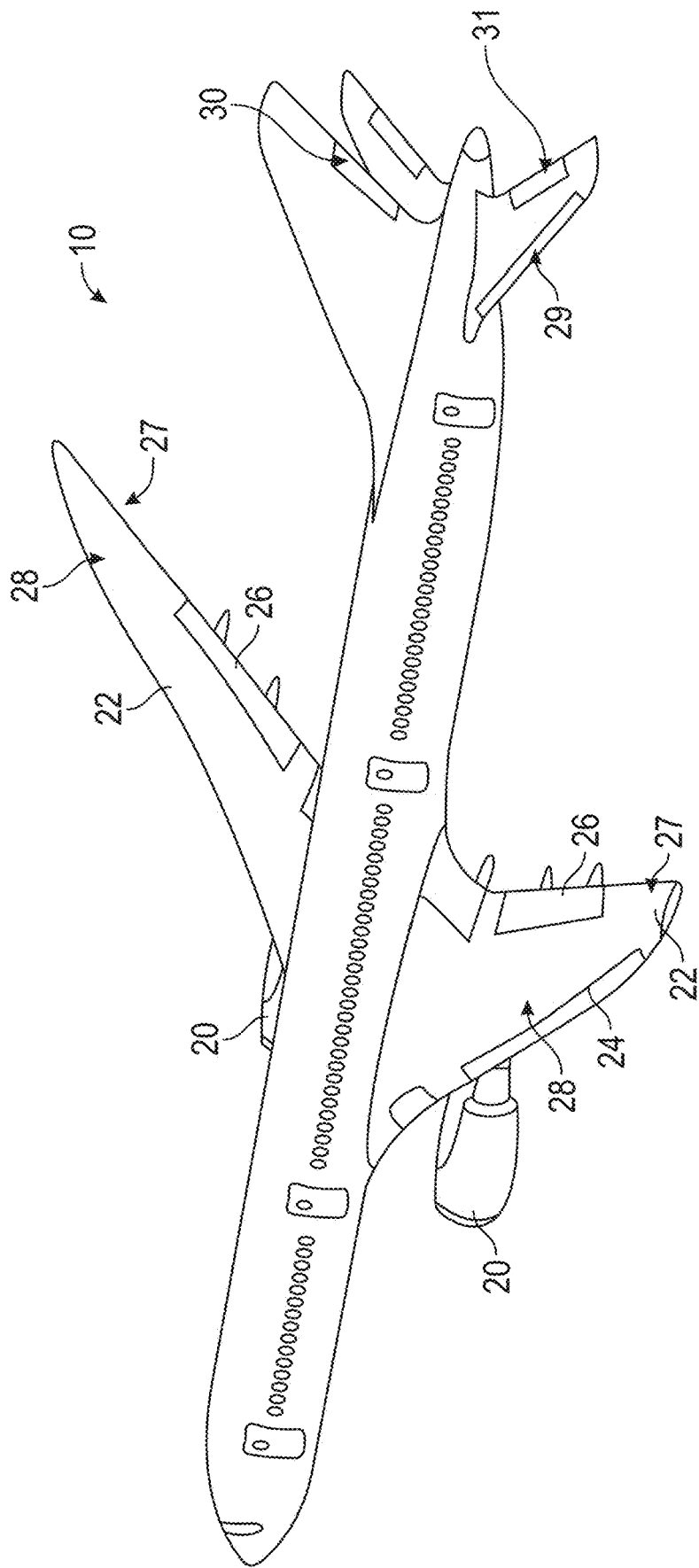
FIG. 1 shows an example of an aircraft on which embodiments disclosed herein can be implemented.

FIG. 1 illustrates an example of a commercial aircraft 10 having aircraft engines 20 that may embody aspects of the teachings of this disclosure. The aircraft 10 includes two wings 22 that each include one or more slats 24 and one or more flaps 26. The aircraft further includes ailerons 27, spoilers 28, horizontal stabilizer trim tabs 29, rudder 30 and horizontal stabilizer 31. The term "control surface" used herein includes but is not limited to either a slat or a flap or any of the above described.

Figure 2:
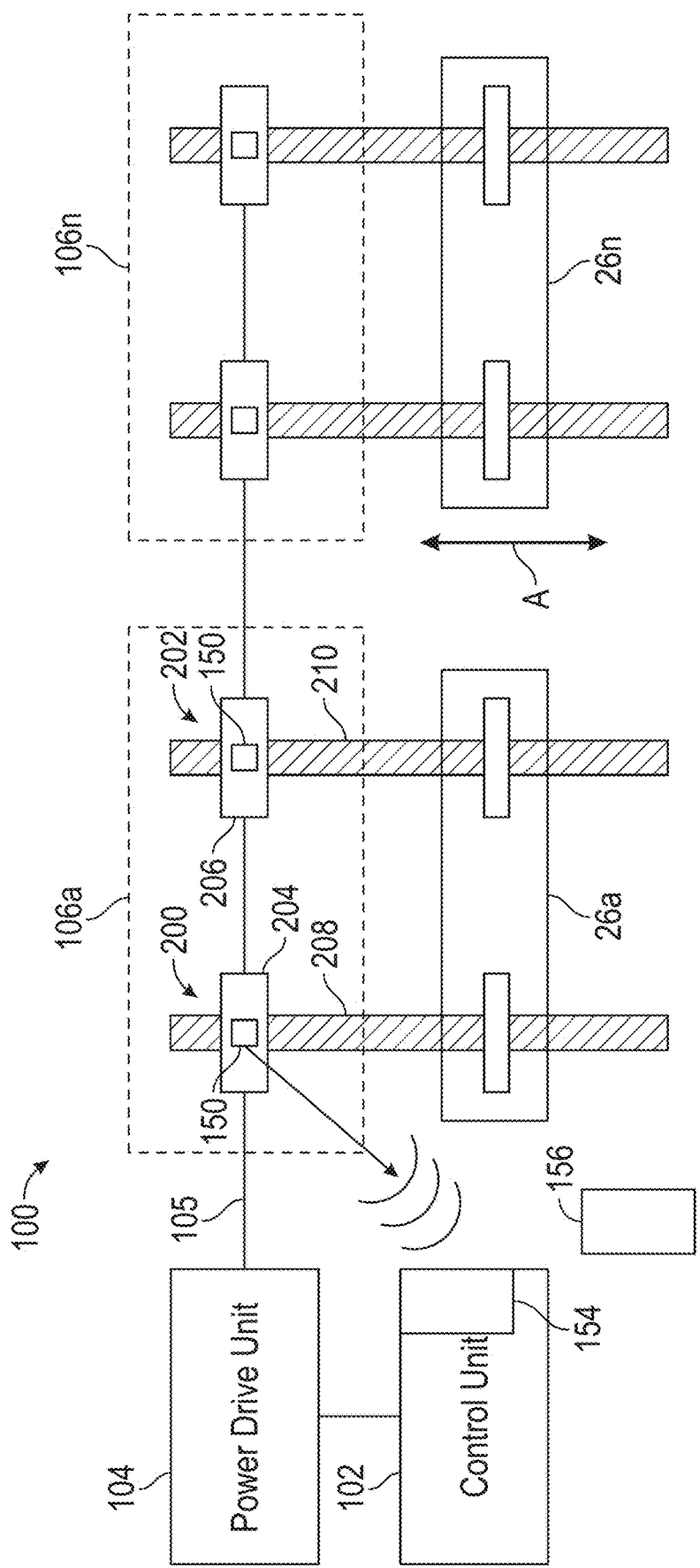
FIG. 2 shows an example configuration of actuators having an over torque sensor according to one embodiment.

FIG. 2 illustrates, generally, a system 100 that can control and monitor the location of one or more control surfaces of an aircraft. As illustrated, the control surfaces are flaps 26. In particular, 2 flaps 26a, 26n are illustrated but any number of flaps could be controlled and monitored by the system 100. Further, while flaps 26 are illustrated, the same teachings herein can also be applied to slats 24 and the other control surfaces as shown in FIG. 1.

The system includes a power drive unit 104 (or drive unit for short). The drive unit 104 can cause a rotation of a drive shaft 105 in order to move one or more of the flaps 26 in either direction in or out as generally indicated by arrow A. To convert the rotary motion of the drive shaft 105 into linear motion to move the flaps 26s, one or more actuator units 106a . . . 106n are provided, with each flap or other control surface having its own actuator unit 106.

Each actuator unit 106 includes two actuators. For example, a first actuator unit 106a includes first and second actuators 200, 202. The first actuator 200 includes an actuator drive unit 204 and a linear translation element 208. The actuator drive unit 204 receives rotatory motion from the drive shaft 105 and causes the linear translation element 208 to move linearly in the direction shown generally by arrow A. Similarly, the second actuator 202 includes an actuator drive unit 206 and a linear translation element 210. The actuator drive unit 206 also receives rotatory motion from the drive shaft 105 and causes the linear translation element 210 to move linearly in the direction shown generally by arrow A. In one embodiment, the linear translation units 208, 210 are ball screws. In another, they may be hydraulic or rotary actuators or any other type of electromechanical actuators.

Each actuator includes an over torque sensor 150. One or more of the over torque sensors 150 (as explained more fully below) includes both a mechanical torque sensor and one or more RFID elements. One of the one or more RFID elements is used in combination with the mechanical element to send a wireless indication of an over torque condition. In one embodiment, the indication can also identify the actuator 202, 204, etc. where the over torque condition exist. The identification can be done by a single RFID element or by a second RFID element. The indication and/or identification can occur during flight (e.g., by the RFID communication portion 154 of the control unit 102) or by an external RFID reader 156 while the aircraft is on the ground or both.

As discussed above, the status of a mechanical indicator cannot easily be known by the flight crew during the flight trip. In some instances, determination of which actuator tripped (e.g., experience an over torque situation) cannot be known until the flight mechanic physically removes the access panels on the wing to visually reveal each actuator and mechanical trip indicator (e.g., each mechanical over torque sensor). As will be more fully disclosed below, embodiments herein can have a technical effect in one or more of the following ways: providing real time and maintenance actuator over torque determination; providing real time actuator jam annunciation determination; and providing identification of problematic actuators without removing wing or aircraft surface panels. These effects can be realized because the movement of a mechanical element of the over torque sensor will cause an RFID element to be enabled to transmit information to an RFID reader such as reader 156 or RFID communication portion 154). This is done because when not experiencing an over torque situation, the mechanical over torque sensor includes a movable element that serves to electrically connect and thereby disable the antennas of an RFID element (or RFID tag). Further, embodiments herein can also accomplish one or more of these effects while adding almost no weight to the aircraft because RFID tags do not require external wiring or a power source if they are passive RFID tags.

The controller 102 issues commands to cause the drive unit 104 to rotate shaft 105. The rotation causes linear motion of the linear translating elements 208, 210. The amount of torque that acts on the actuators 200, 202 should be less than a predetermined amount in normal operating conditions. In one embodiment, when the torque exceeds this amount, a mechanical element opens.

Figure 3A:
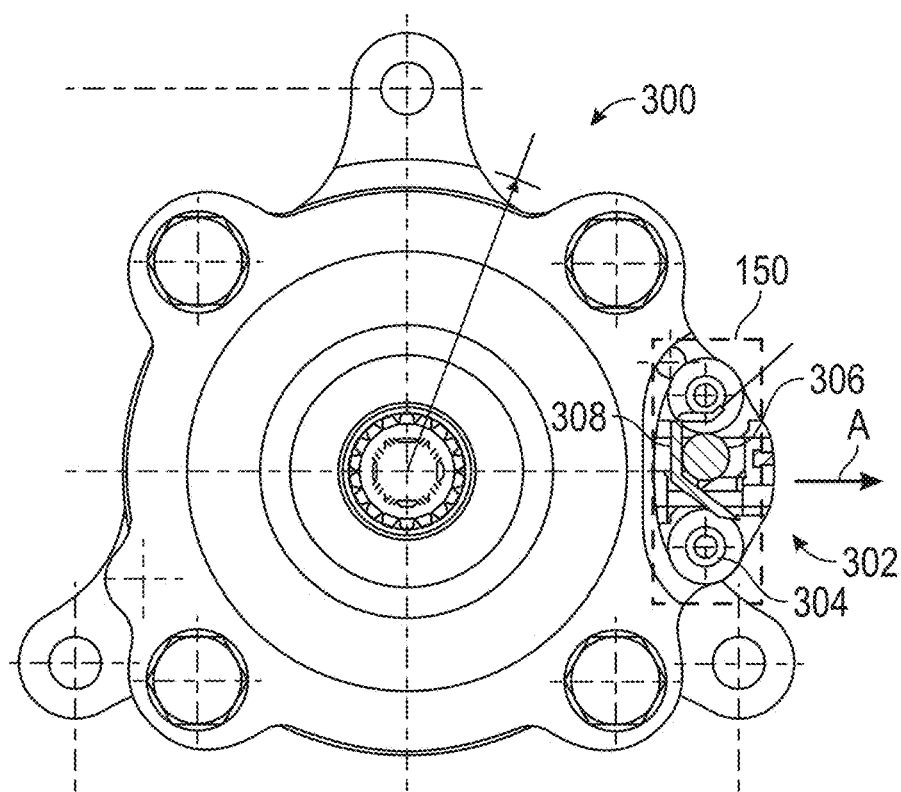
FIGS. 3A and 3B show an actuator having an over torque sensor according to one embodiment in both a closed (normal operating) state and an open (over torque) state, respectively.
Figure 3B:
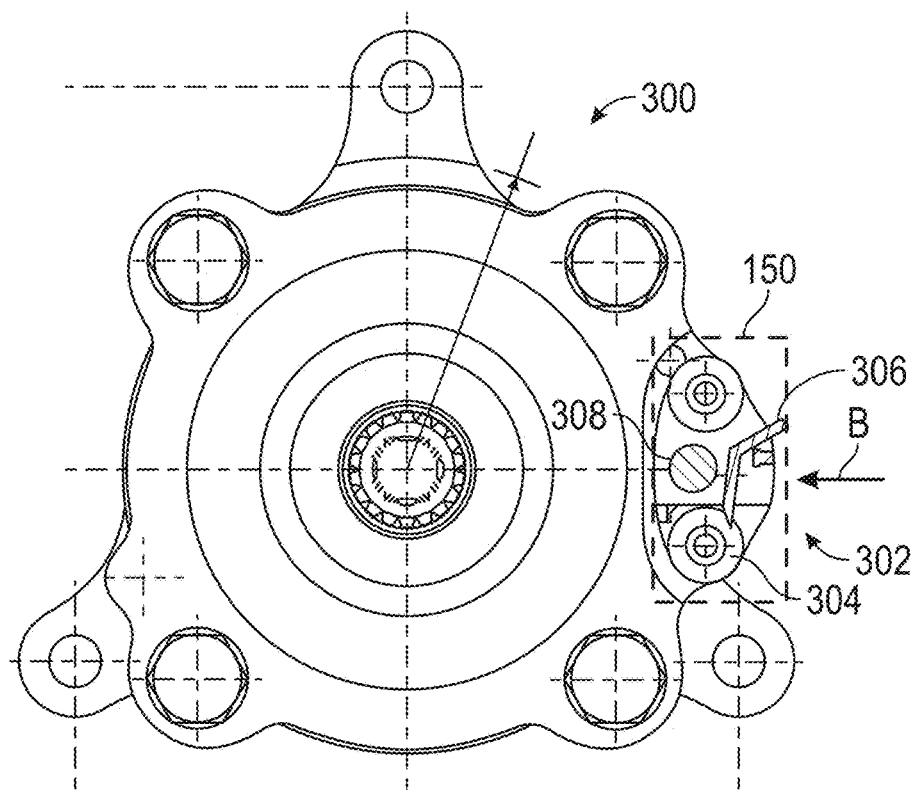

For example, and referring now to FIGS. 3a and 3b, an example actuator 300 includes an over torque sensor 150. The over torque sensor 150s as illustrated includes a mechanical torque sensor 302. As will more fully be described below, the over torque sensor also includes one or more RFID tags.

As shown, the mechanical torque sensor 302 includes a first element 304. A spring or other moveable element 306 is coupled to first contact element 304. The mechanical torque sensor 302 can also include a second contact element 308. In the normal operational state (e.g., closed state) the moveable element 306 is in contact with the second contact element 308 and creates an electrical pathway between the first contact element 304 and the second contact element 308. In this state, the moveable element 306 is biased to move in the direction shown by arrow A.

Upon experiencing an over torque condition, the second contact element 308 moves in a manner (e.g., moves into the sensor 302) that allows the movable element 306 to move to an over torque operational state (e.g., open state) where the moveable element 306 is no longer in electrical communication with the second contact element 308 and the pathway between them first and second contact elements 304, 308 is removed. Such a device can be reset by manually pushing the movable element 306 back in the direction shown by Arrow B in FIG. 3B after the over torque condition is no longer present (e.g., after landing). Such devices are known in the art and not discussed further herein.

Figure 4:
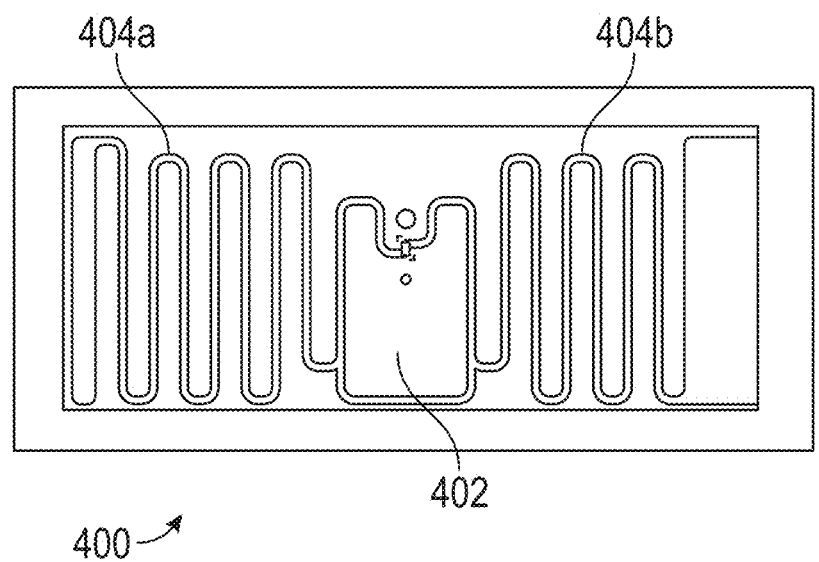
FIG. 4 shows an example of an RFID tag.

FIG. 4 shown an example of an RFID tag 400. The tag 400 forms part of an example over torque sensor 150. The tag 400 includes a controller 402 and an antenna 404. In general, if the RFID tag 400 is a passive tag it collects energy from a nearby RFID reader's interrogating signal (e.g., radio waves) via the antenna 404. The controller 402 can include a storage element to store power received by the antenna 404. The storage element can then provide power to logic and other circuitry that is used to drive the antennas to send a signal back to the reader (e.g., reader 156 or RFID communication portion 154 in FIG. 2). The signal can include an identification of the tag/actuator that it is coupled to in one embodiment. In the event the RFID tag is an active tag, it may include a battery to provide the required power. In either case, the tag information is stored in a non-volatile memory. The RFID tag 400 can include either fixed or programmable logic for processing the transmission and sensor data, respectively.

In one embodiment, the antenna 404 includes two portions 404a, 404b. Herein, when these two portions are connected together, the RFID tag 400 is in the so-called "disabled state" and cannot transmit information.

Figure 5:
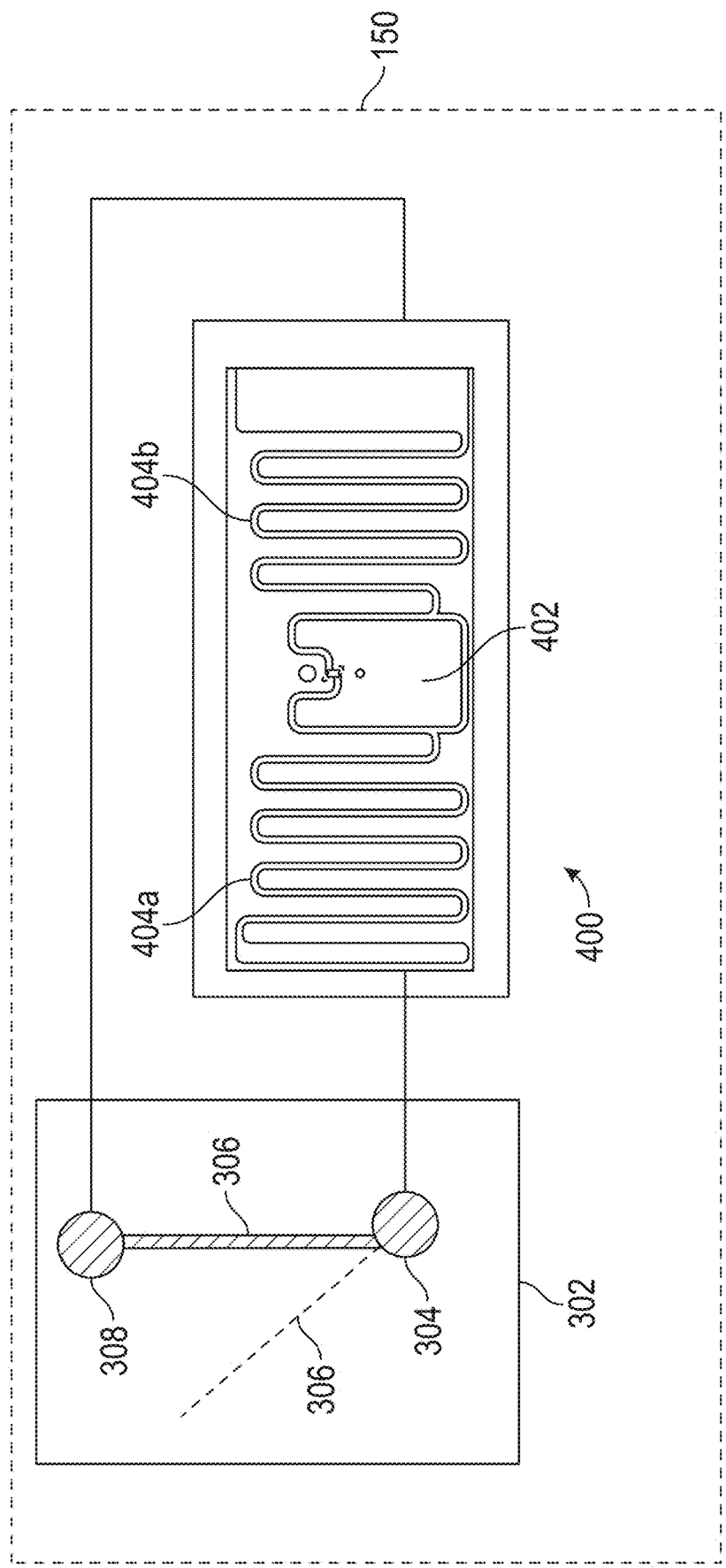
FIG. 5 shows an RFID tag connected to a mechanical over torque element to form an over torque sensor according to one embodiment.

As shown in FIG. 5, in one embodiment, the RFID tag 400 is connected to the first contact element 304 and the second contact element 308. As such, the combination of the RFID tag 400 and the contacts 304, 308 (and the moveable element 306) form an over torque sensor 150 according to one embodiment.

As shown, a first antenna portion 404a is connected to first contact element 304 and a second antenna portion 404b is connected to the second contact element 308 of FIGS. 3A and 3B. Of course, the connections could be reversed and second antenna portion 404b would be connected to first contact element 304 and first antenna portion 404a would be connected to the movable contact element 308.

Regardless, when the moveable element 306 is in the closed position (e.g., FIG. 3A), the two antenna portions 404a, 404b are connected and shorted together. In such a configuration, the tag 400 is inoperative and cannot transmit information to a reader.

When the moveable element 306 is in the open position (e.g., FIG. 3B) the two antenna portions 404a, 404b are not shorted together. In such a configuration, the tag 400 is operative and can transmit information to a reader.

As will be understood based on the above discussion, when the over torque sensor "opens" (e.g., the movable element 306 is in the position of FIG. 3B and is not establishing an electrical pathway between the first and second contact elements 306, 308), the RFID tag 400 can inform any RFID reader on the aircraft or on the ground that an over torque condition is occurring or has occurred. Further, when the torque sensor is in the closed position while operating under normal torque conditions, the RFID tag is shorted and does not provide a response to a reader.

Figure 6:
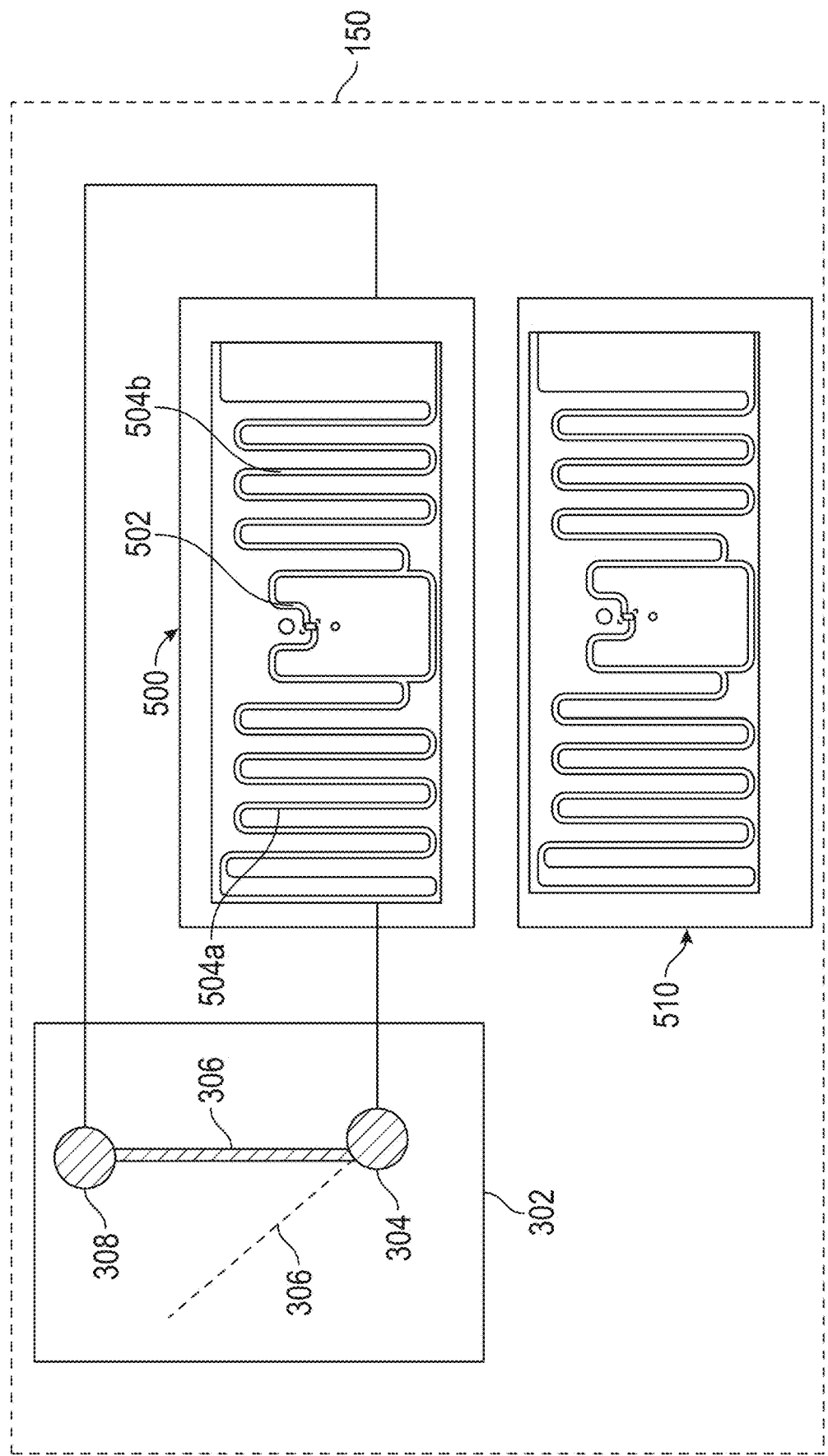
FIG. 6 shows an RFID tag connected to a mechanical over torque element to form an over torque sensor according to another embodiment.

It will be understood that in another embodiment, two RFID tags 500, 510 can be provided as shown in FIG. 6. The first RFID tag 500 may operate in the same manner as described above and includes controller 502 and antennas 504a, 504b. In this embodiment, the first RFID tag 500 only provides an indication of an error and possibly an identification of the associated actuator. Other identification information can come from the second RFID tag 510. Such information can be used to determine all actuators present in the system and then, when the first RFID tag 500 begins to operate, which actuator has experienced an over torque situation.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An over torque detection system, the system comprising:
   a mechanical torque sensor that includes:
      a first contact element;
      a moveable element coupled to the first contact element; and
      a second contact element;
      wherein in a normal operational state the moveable element is in contact with the second contact element and creates an electrical pathway between the first contact element and second contact element and when in over torque operational state the movable element moves such that it does not contact the second contact element and breaks any electrical pathway between the first contact element and the second contact element; and a radio frequency identification (RFID) tag connected to the first contact element and the second contact element such that when the mechanical torque sensor is in the normal operation state the RFID tag does not transmit information, and when the mechanical torque sensor is in the over torque operation state the RFID tag does transmit information.

2. The system of claim 1, wherein the antenna has first and second portions, the first portion being connected to the first contact element and the second portion being connected to the second contact element.

3. The system of claim 2, wherein when the mechanical torque sensor is in the normal operation state, the two portions are electrically connected to one another through the moveable element.

4. The system of claim 3, wherein the moveable element is a spring.

5. The system of claim 4, wherein the spring is biased to move away from the second contact element.

6. The system of claim 2, wherein when the mechanical torque sensor is in the over torque operation state, the two antenna portions are not electrically connected to one another through the moveable element.

7. The system of claim 6, wherein the moveable element is a spring.

8. The system of claim 7, wherein the spring is biased to move away from the second contact element.

9. The system of claim 1, wherein when the mechanical torque sensor is in the over torque state the RFID tag transmits information that identifies the actuator to which it is attached.

10. A method of determining that an aircraft actuator installed on an aircraft has experienced an over torque condition, the actuator including a first contact element, a moveable element coupled to the first contact element; a second contact element, wherein in a normal operational state the moveable element is in contact with second contact element and creates an electrical pathway between the first contact element and the second contact element, and when in over torque operational state the movable element moves such that it does not contact second contact element and breaks any electrical pathway between the first contact element and the second contact element, the method comprising:

coupling an RFID tag to the first contact element and the second contact element such that when the mechanical torque sensor is in the normal operation state the RFID tag does not transmit information and when the mechanical torque sensor is in the over torque operation state the RFID tag does transmit information;

sending an interrogation signal from an RFID reader; and receiving, at the RFID reader, information back from the RFID tag.

11. The method of claim 10, wherein the RFID reader sends the interrogation signal during a flight and receives the information back during the flight.

12. The method of claim 11, wherein the RFID reader is located within the aircraft.

13. The method of claim 10, wherein the RFID reader sends the interrogation after the conclusion of a flight while the aircraft is on the ground.

14. The method of claim 13, wherein the RFID reader is located outside of the aircraft.

15. The method of claim 10, wherein the antenna has first and second portions and coupling further comprises:

connecting the first portion to the first contact element and connecting the second portion to the second contact element.

16. The method of claim 10, wherein when the mechanical torque sensor is in the normal operation state, the two antenna portions are electrically connected to one another through the moveable element.

17. The method of claim 16, wherein the moveable element is a spring.

* * * * *